(12) United States Patent
Kawataka

(10) Patent No.: US 6,865,240 B1
(45) Date of Patent: Mar. 8, 2005

(54) FRAME SYNCHRONIZING CIRCUIT

(75) Inventor: Miyuki Kawataka, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/540,892

(22) Filed: Mar. 31, 2000

(30) Foreign Application Priority Data

Sep. 20, 1999 (JP) .......................................... 11-266000

(51) Int. Cl.[7] .............................................. H04L 7/00
(52) U.S. Cl. ....................... 375/368; 375/134; 375/365; 714/707; 714/789; 714/798; 370/511; 370/513
(58) Field of Search ................ 375/134, 142, 375/393, 342, 357, 365, 366, 368, 354, 359, 293, 375; 714/700, 704, 707, 789, 798; 370/511, 513, 505, 510, 512, 324, 350, 503, 590, 514; 371/1, 5.1, 5.4, 47.1

(56) References Cited

U.S. PATENT DOCUMENTS 4,574,377 A * 3/1986 Miyazaki et al. ........... 370/510
5,592,518 A * 1/1997 Davis et al. ................ 375/368
6,535,566 B1 * 3/2003 Tamamura et al. ......... 375/371
2003/0161349 A1 * 8/2003 Marutani ..................... 370/513

FOREIGN PATENT DOCUMENTS

| JP | 63-236434 | 10/1988 |
| JP | 5-37515 | 2/1993 |
| JP | 6-164572 | 6/1994 |
| JP | 7-235920 | 9/1995 |

* cited by examiner

Primary Examiner—Jean B. Corrielus
Assistant Examiner—Guillermo Munoz
(74) Attorney, Agent, or Firm—Katten Muchin Zavis Rosenman

(57) ABSTRACT

The frame synchronizing circuit establishes frame synchronization by detecting a sync pattern laid in an incoming frame. The frame synchronization circuit comprises a first frame synchronizing unit and a second frame synchronizing unit. The first and second synchronizing units synchronize with a first pattern, a second pattern at a first position and a second position, respectively. Thereafter, when the first position used for the synchronization by the first frame synchronizing unit is found to be in error, the first frame synchronizing unit synchronizes with the second pattern at the second position used by the second frame synchronization unit.

9 Claims, 10 Drawing Sheets

| FRAME No. | BIT No. | F BIT (1 BIT) | PAYROAD (192 BITS) |
|---|---|---|---|
| 0 | 0 ~ 192 | M | |
| 1 | 193 ~ 385 | CRC6 | |
| 2 | 386 ~ 578 | M | |
| 3 | 579 ~ 771 | FPS | |
| 4 | 772 ~ 964 | M | |
| 5 | 965 ~ 1157 | CRC6 | |
| 6 | 1158 ~ 1350 | M | |
| 7 | 1351 ~ 1543 | FPS | |
| 8 | 1544 ~ 1736 | M | |
| 9 | 1737 ~ 1929 | CRC6 | |
| 10 | 1930 ~ 2122 | M | |
| 11 | 2123 ~ 2315 | FPS | |
| 12 | 2316 ~ 2508 | M | |
| 13 | 2509 ~ 2701 | CRC6 | |
| 14 | 2702 ~ 2894 | M | |
| 15 | 2895 ~ 3087 | FPS | |
| 16 | 3088 ~ 3280 | M | |
| 17 | 3281 ~ 3473 | CRC6 | |
| 18 | 3474 ~ 3666 | M | |
| 19 | 3667 ~ 3859 | FPS | |
| 20 | 3860 ~ 4052 | M | |
| 21 | 4053 ~ 4245 | CRC6 | |
| 22 | 4246 ~ 4438 | M | |
| 23 | 4439 ~ 4631 | FPS | |

FRAME SYNCHRONIZING CIRCUIT

BACKGROUND OF THE INVENTION

The present invention relates to a frame synchronizing circuit which establishes frame synchronization by detecting a predetermined sync (synchronization) pattern in a frame or frames.

Conventionally, in transmitting digital data by frame, a technique is commonly employed that a sync pattern is incorporated in each frame at a predetermined position and frame synchronization is established on the reception side by detecting it. For example, Japanese Patent Laid-Open Publications Nos. 5-37515, 63-236434, and 6-164572 have disclosed various frame synchronizing circuits in which a main synchronization circuit and an auxiliary synchronization circuit are combined.

As disclosed in the above publications, by virtue of the presence of the auxiliary synchronization circuit in addition to the main synchronization circuit, even if the main synchronization circuit is rendered in a pseudo-synchronization state, another synchronization state can be established.

In the frame synchronizing circuit disclosed in Japanese Patent Laid-Open Publication No. 5-37515, a judgment circuit compares the number of errors detected by the main synchronization circuit with the number of errors detected by the auxiliary synchronization circuit to judge whether the main synchronization circuit is in a pseudo-synchronization state; if the former number is larger than the latter number, the sync position of the auxiliary synchronization circuit is set as a sync position of the main synchronization circuit. Because of execution of a large number of steps, the frame synchronizing circuit has a problem that it takes long time to establish synchronization again.

In the frame synchronizing circuit disclosed in Japanese Patent Laid-Open Publication No. 63-236434, an unprotected sync position is established because the main synchronization circuit enables only forward protection. Therefore, after a synchronization state established by the main synchronization circuit is broken, in many cases a correct sync position is detected by the auxiliary synchronization circuit having a backward protection function. This frame synchronization circuit still has a problem that it takes long time until synchronization is established reliably.

In the frame synchronizing circuits disclosed in the above two publications, if a false pattern similar to the sync pattern, that is, a pseudo-sync pattern is included in frames periodically, a sync position is set based on the pseudo-sync patterns and thereafter returning to a correct sync position is disabled. As a countermeasure against such a problem, the frame synchronizing circuit disclosed in Japanese Patent Laid-Open Publication No. 6-164572 performs error detection using a CRC code. However, the auxiliary synchronization circuit in the frame synchronizing circuit starts a pull-in, synchronization operation for the next sync position when the main synchronization circuit pulls out of synchronism, is out of synchronization. Therefore, the frame synchronizing circuit has a problem that it takes long time to re-establish synchronization after it is in the out-of-sync state.

SUMMARY OF THE INVENTION

It is therefore an object of the present invention to provide a frame synchronizing circuit capable of detecting a correct synchronization position and reducing the time for establishment of synchronization.

According to an aspect of the present invention, there is provided a frame synchronizing circuit comprising: a synchronization pattern detecting unit that detects a first pattern and a second pattern each similar to a predetermined synchronization pattern in input data within a predetermined period of time; a first frame synchronizing unit that synchronizes with the first pattern at the first position of the input data; a second frame synchronizing unit that synchronizes with the second pattern at the second position of the input data; and a first error detecting unit that detects that the first position is different from the position of the predetermined synchronization pattern, that controls the first frame synchronizing unit to operate in accordance with the second position.

When a first pattern and a second pattern similar to the predetermined synchronization pattern are detected in the incoming frame, the synchronization by the first frame synchronizing unit based on the position of the first pattern and the synchronization by the second frame synchronizing unit based on the position of the second pattern are simultaneously carried out. If the position of the first pattern is different from the position of the predetermined synchronization pattern, the position of the second pattern is used for another synchronization by the first frame synchronizing unit. This reduces the time for establishment of another synchronization.

It is preferable that the synchronization by the first frame synchronizing unit and the synchronization by the second frame synchronizing unit differ from each other. If the position of the first pattern and the position of the second pattern coincide with each other, the second frame synchronizing unit carries out the synchronization different from that of the first frame synchronizing unit, which can provide different synchronization.

Preferably, the frame synchronizing circuit further comprises a second error detecting unit that detects that the second position is different from the position of the predetermined synchronization pattern, wherein the synchronization pattern detecting unit detects a third pattern similar to the predetermined synchronization pattern in the input data, and controls the second frame synchronizing unit to operate in accordance with the third position. When the position of the second pattern is not true, the third pattern is searched for. This reduces the probability that the synchronization by the first frame synchronizing unit is repeated on the basis of wrong or false positions, which leads to reduction of the time for the first synchronization unit to complete synchronization.

It is preferable that the first error detecting unit detects that the first position is different from the position of the predetermined synchronization pattern based on information other than the synchronization pattern in the frame. Using information other than the synchronization pattern in the frame enables correctly detecting whether the position of the first pattern is true or false. It is further preferable that the information includes a CRC code, and when detecting the out-of-synchronization state of the frame continues for a predetermined period of time by using the CRC code, the first error detecting unit detects that the first position is not the position of the predetermined synchronization pattern. Using the CRC code as the information enables correct and efficient detection of whether or not the position of the first pattern is the position of the predetermined synchronization pattern.

It is preferable that the synchronization by the second frame synchronizing unit is selectively disabled by setting a predetermined mask. Selectively disabling the synchronization of the first frame synchronizing unit by setting a mask prevents wrong detection of a pattern that is laid in the information other than the predetermined synchronization pattern in the frame and is similar to the predetermined synchronization pattern.

Preferably, the frame synchronizing circuit further comprises a third error detecting unit that detects that the first position is different from the position of the predetermined synchronization pattern, based on a bit error with respect to the first pattern. Using the bit error with respect to the first pattern enables quick transition to another synchronization, which shortens the time for establishment of synchronization.

According to another aspect of the present invention, there is provided a frame synchronizing circuit comprising: a synchronization pattern detecting unit that detects a plurality of patterns similar to a predetermined synchronization pattern in the input data; a plurality of frame synchronizing units that each synchronize with one of the plurality of the patterns specified in order of detection at the position of the input data; and a first error detecting unit that detects that a first position of the plurality of positions is different from the position of the predetermined synchronization pattern, that controls the frame synchronizing unit corresponding to the first position to operate in accordance with a second position of the plurality of position other than the first position.

When a plurality of patterns similar to the predetermined synchronization pattern are detected in the frame, a plurality of synchronization are carried out by the plurality of frame synchronizing units based on the respective positions of the detected patterns. This provides a large number of candidate positions capable of serving as the position of the first pattern, which reduces the time for the first frame synchronizing unit to complete establishment.

BRIEF DESCRIPTION OF THE DRAWINGS

FIG. 4 shows a configuration of a DS1 multi-frame;

DESCRIPTION OF THE PREFERRED EMBODIMENT

A frame synchronizing circuit according to an embodiment of the present invention will be hereinafter described with reference to the accompanying drawings.

Figure 1:
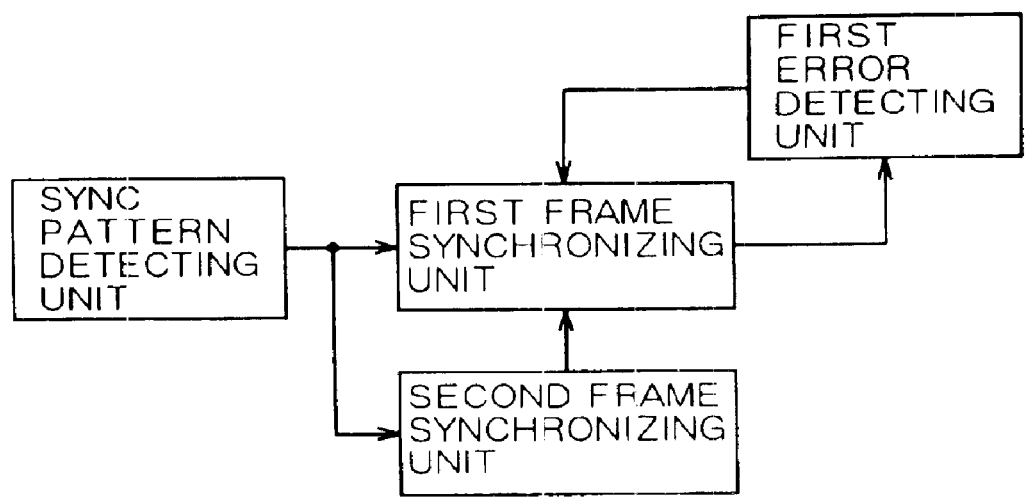
FIG. 1 is a block diagram showing the principle of the present invention.

FIG. 1 is a block diagram showing the principle of the invention. As shown in FIG. 1, the frame synchronizing circuit of this invention comprises a sync pattern detecting unit, a first frame synchronizing unit, a second frame synchronizing unit, and a first error detecting unit.

Figure 2:
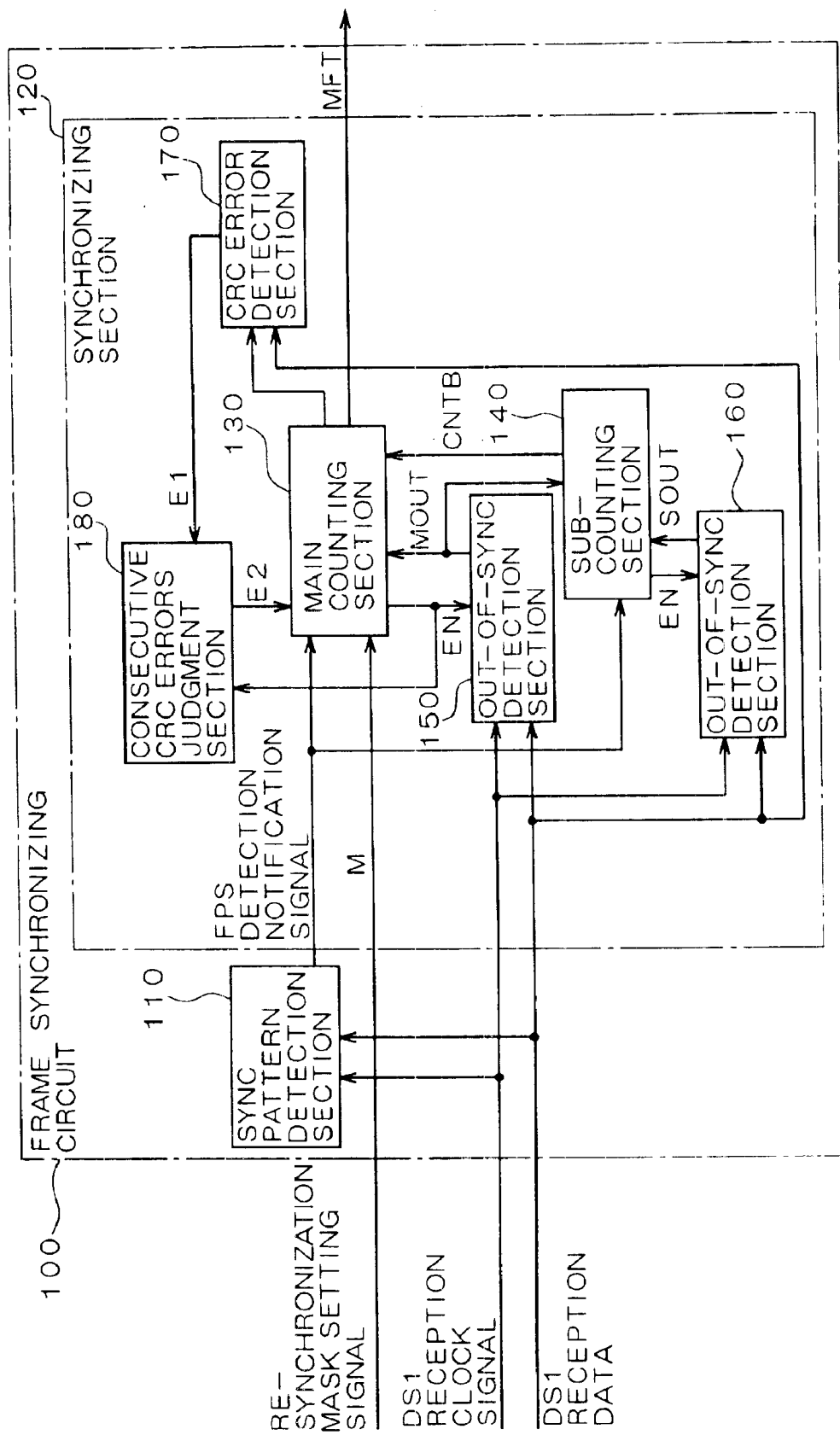
FIG. 2 is a block diagram showing a frame synchronizing circuit according to an embodiment of the invention.

FIG. 2 is a block diagram showing the frame synchronizing circuit according to the embodiment. The frame synchronizing circuit 100 of FIG. 2 incorporates a sync pattern detection section 110 and a synchronizing section 120. The synchronizing section 120 includes a main counting section 130, a sub-counting section 140, two out-of-sync detection sections 150 and 160, a CRC error detection section 170, and a consecutive CRC errors judgment section 180. DS1 reception data and a DS1 reception clock signal that have been extracted from a first-group DS1 signal for North America, for example, are input to the frame synchronizing circuit 100. The frame synchronizing circuit 100 establishes frame synchronization by detecting a predetermined sync pattern in the DS1 reception data.

Figure 3:
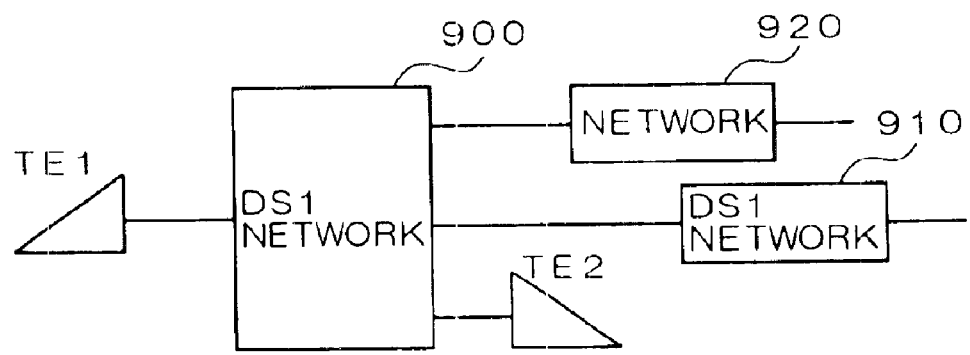
FIG. 3 shows an example configuration of a communication system which includes various apparatuses that are equipped with the frame synchronizing circuit of FIG. 2.

FIG. 3 shows an example configuration of a communication system (e.g., a system using a DS1 network for transmitting a first-group signal) which includes various apparatuses that are equipped with the frame synchronizing circuit 100 of FIG. 2. As shown in FIG. 3, DS1 terminals TE1 and TE2 are connected to a DS1 network 900. Data is exchanged between the terminals TE1 and TE2 by using frames having a predetermined format. The DS1 network 900 is connected to another DS1 network 910 and another kind of network 920. Data is transferred between those networks. In such a communication system in which a communication is performed via the DS1 network 900, data that is exchanged among the DS1 terminals TE1, TE2 and the DS1 network 900 includes a predetermined sync pattern for every 24 frames (e.g., every multi-frame). The frame synchronizing circuit 100 provided in the DS1 terminals TE1 and TE2 and in the DS1 network 900 that are going to receive frames starts a capturing operation in which synchronization will be established when, for example, two consecutive sync patterns in respective multi-frames have been detected.

FIG. 4 shows the structure of a DS1 multi-frame. One DS1 multi-frame is formed by 24 frames (0th–23rd frames) each consisting of 193 bits. A 1-bit F (frame) bit is located at the head of each frame and a predetermined sync pattern is formed by the six F bits of the 3rd, 7th, 11th, 15th, 19th, and 23rd frames. Each of those six F bits is called "FPS (frame pattern sequence) bit." The six FPS bits collectively form an FPS pattern as a sync pattern. Specifically, "001011" is set as the FPS pattern.

The six F bits of the 1st, 5th, 9th, 13th, 17th, and 21st frames collectively form a CRC (cyclic redundancy check) 6 bits. Existence of a transmission error in a received DS1 multi-frame can be detected by calculating the value of the CRC code based on the received DS1 multi-frame and checking whether it is equal to the value of the correct CRC 6 bits. If synchronization is established at an erroneous sync position, the presence of the error should be detected based on the CRC 6 bits. Therefore, in this embodiment, if such a CRC error state continues for a long time, it is judged that the already established synchronization state is in error.

Next, the detailed configuration of the frame synchronizing circuit 100 of FIG. 2 will be described. The sync pattern detection section 110 shown in FIG. 2 detects two consecutive FPS patterns from a received DS1 signal. As described above, each DS1 multi-frame consists of 24 frames and FPS bits constituting an FPS pattern are the F bits of the 3rd, 7th, 11th, 15th, 19th, and 23rd frames, respectively. Therefore, two consecutive FPS patterns can be detected by monitoring whether 12 bits extracted from the DS1 signal at a period of 772 bits coincide with the bit sequence ("001011001011") of two consecutive FPS patterns. When detecting such a coincident state, the sync pattern detection section 110 outputs a pulse-like FPS detection notification signal. If FPS patterns that are included in DS1 multi-frames that are thereafter input sequentially are correct, FPS detection notification signal are output at the same intervals as the input interval of the multi-frames.

The sync pattern detection section 110 outputs an FPS detection notification signal also when detecting, after detecting two consecutive FPS patterns first, another two consecutive FPS patterns at a different bit position. Therefore, in this case, two or three or more FPS detection notification signals are generated within the one multi-frame input period T.

Figure 5:
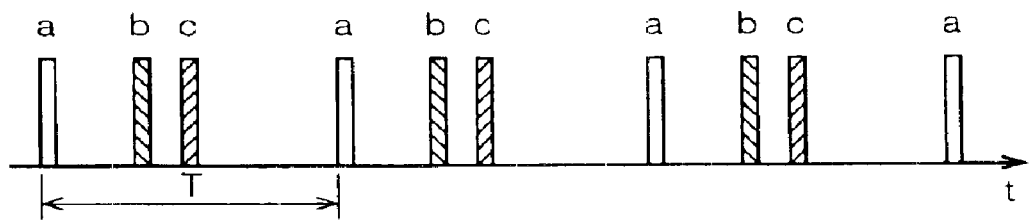
FIG. 5 shows signal output timing in a case where a plurality of FPS detection notification signals are output.

FIG. 5 shows signal output timing in a case where plural kinds of FPS detection notification signals are output. When detecting two consecutive correct FPS patterns, the sync pattern detection section 110 thereafter outputs first-kind FPS detection notification signals a at the period T that is equal to the input interval of DS1 multi-frames. If other one or plural kinds of two consecutive correct FPS patterns (other two kinds in FIG. 5) exist in the multi-frames at other bit positions, the sync pattern detection section 110 also outputs second and third-kind FPS detection notification signals b and c that correspond to those respective bit positions.

The synchronizing section 120 serves to establish synchronization of a DS1 signal based on FPS detection notification signals that are output from the sync pattern detection section 110. The main counting section 130 acts to establish main synchronization in response to a first-input FPS detection notification signal, and the sub-counting section 140 acts to establish sub-synchronization at a different time point than when the main synchronization is established.

The main counting section 130 starts a counting operation for the 4,632 bits constituting one multi-frame when a first-kind FPS detection signal a is output from the sync pattern detection section 110, and generates a multi-frame timing signal MFT once per multi-frame. The multi-frame timing signal MFT is output as a sync signal that is output from the frame synchronizing circuit 110. The out-of-sync detection section 150, the CRC error detection section 170, and the consecutive CRC errors judgment section 180 perform respective operations by using, as a reference, a sync position that is set by the main counting section 130.

The out-of-sync detection section 150 extracts consecutive four bits from the FPS pattern in a multi-frame that corresponds to a sync position that is set by the main counting section 130, and detects that the out-of-sync state has occurred when two bits of those four bits are in error. Four consecutive bits need not always be extracted from one multi-frame and may be extracted from two consecutive multi-frames.

The CRC error detection section 170 extracts CRC 6-bit data from each input multi-frame and detects an error, if any, in each bit data of a multi-frame based on the extracted CRC 6-bit data. When detecting such an error, the CRC error detection signal 170 outputs a CRC error notification signal E1 to the consecutive CRC errors judgment section 180.

The consecutive CRC errors judgment section 180 monitors presence of a CRC error notification signal E1 to be input from the CRC error detection section 170 and its input period. If CRC error notification signals E1 are input consecutively during a period of 32 multi-frames, the consecutive CRC errors judgment section 180 forwards a re-synchronization instruction signal E2 that orders re-synchronization setting to the main counting section 130. The above-described out-of-sync detection section 150 detects the out-of-sync state when, for example, two of four bits of a sync pattern are in error. However, in such a simple detecting operation, even when a particular bit pattern that arises periodically is erroneously detected as the FPS pattern and synchronization is thereby established at an erroneous position, such a state may continue for a long time. To prevent such an event, the out-of-sync state is detected based on a judgment result of the consecutive CRC errors judgment section 180.

The sub-counting section 140 starts a counting operation for the 4,632 bits constituting one multi-frame when a second-kind FPS detection notification signal (e.g., a signal b shown in FIG. 5) is output from the sync pattern detection section 110. Therefore, the sub-counting section 140 operates at different time point that when the main counting section 130 does, and the out-of-sync state detection section 160 operates using, as a reference, a sync position that is set by the sub-counting section 140.

For example, the out-of-sync detection section 160 extracts four consecutive bits from an FPS pattern in a multi-frame that corresponds to a sync position that is set by the sub-counting section 140, and detects that the out-of-sync state has occurred when two bits of those four bits are in error. As in the case of the out-of-sync detection section 150 for the main counting section 130, four consecutive bits need not always be extracted from one multi-frame and may be extracted from two consecutive multi-frames.

With respect to the relationship between the embodiment and the claims, the above-described sync pattern detection section 110 corresponds to the sync pattern detecting unit, the main counting section 130 corresponds to the first frame synchronizing unit, the sub-counting section 140 corresponds to the second frame synchronizing unit, the CRC error detection section 170 and the consecutive CRC errors judgment section 180 correspond to the first error detecting unit, the out-of-sync detection section 160 corresponds to the second error detecting unit, and the out-of-sync detection section 150 corresponds to the third error detecting unit.

Next, the operation of the frame synchronizing circuit 100 will be described.

Figure 6:
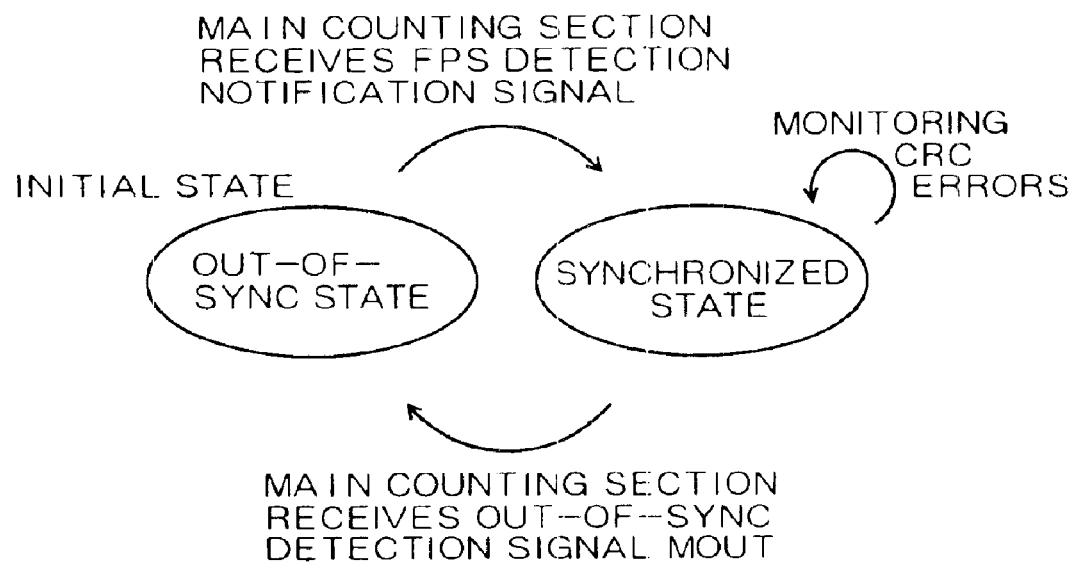
FIG. 6 is a synchronization state transition diagram corresponding to a main counting section.

FIG. 6 is a synchronization state transition diagram of the main counting section 130. The state of the main counting section 130 is initially in an out-of-sync state. On receiving an FPS detection notification signal that is output from the sync pattern detection section 110, the main counting section 130 makes a transition to a synchronized state. At this time, an enable signal EN is sent from the main counting section 130 to the out-of-sync detection section 150 and the consecutive CRC errors judgment section 180, which in response perform respective out-of-sync detecting operations.

To the contrary, a transition from a synchronized state to an out-of-sync state is made when the out-of-sync detection section 150 detects the out-of-sync state. If the out-of-sync state is detected, an out-of-sync detection signal MOUT is output from the out-of-sync detection section 150 to the main counting section 130. When detecting the signal, the main counting section 130 stops the counting operation that has been performed in response to a FPS detection notification signal that has been output from the sync pattern detection section 110. Therefore, the output of a multi-frame timing signal MFT is stopped and an out-of-sync state is kept thereafter.

When the consecutive CRC errors are detected by the consecutive CRC errors judgment section 180, the synchronized state is maintained eventually in the same way as when no CRC errors are detected. However, the synchronized state changes depending on whether the sub-counting section 140 is in a synchronized state or an out-of-sync state.

Figure 7:
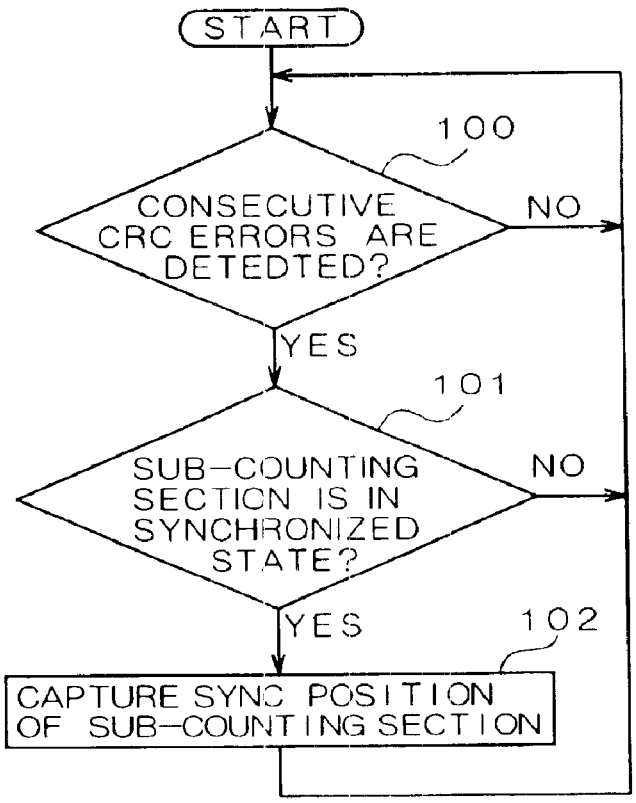
FIG. 7 is a flowchart showing an operation of maintaining a synchronized state of the main counting section that depends on the judgment result of a consecutive CRC errors judgment section.

FIG. 7 is a flowchart showing an operation of maintaining a synchronized state of the main counting section 130 that depends on the judgment result of the consecutive CRC errors judgment section 180. Upon making a transition to a synchronized state, the main counting section 130 judges whether the consecutive errors judgment section 180 (step 100) has detected consecutive CRC errors. If consecutive CRC errors have not been detected by the consecutive errors judgment section 180, the judgment operation of step 100 is repeated. If consecutive CRC errors are detected, the consecutive CRC errors judgment section 180 outputs a re-synchronization instruction signal E2, and the main counting section 130 judges whether the sub-counting section 140 is in a synchronized state (step 101). If the sub-counting section 140 is in a synchronized state, the main counting section 130 captures a count value of the counter 141 of the sub-counting section 140 and establishes a new synchronized state (step 102). On the other hand, if the sub-counting section 140 is in an out-of-sync state, the current synchronized state is maintained.

Whether to enable or disable the above operation mode of causing the main-counting section 130 to capture a sync position of the sub-counting section 140 can be set externally (this operation mode is called "re-synchronization mode"). For example, if a re-synchronization mask setting signal M that is input to the main counting section 130 is kept in a low-level state, thereafter the re-synchronization mode operation of the main counting section 130 is disabled.

Figure 8:
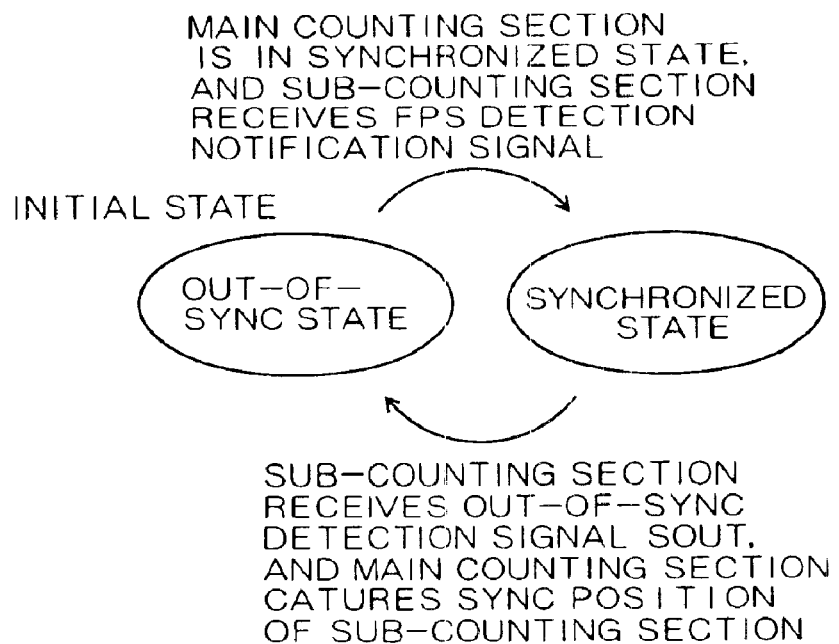
FIG. 8 shows a synchronization state transition diagram corresponding to a sub-counting section.

FIG. 8 shows a synchronization state transition diagram of the sub-counting section 140. The sub-counting section 140 is initially in an out-of-sync signal. If the main counting section 130 is in a synchronized state and the sub-counting section 140 receives an FPS detection notification signal that is output from the sync pattern detection section 110, the sub-counting section 140 makes a transition to a sub-synchronized state at a different position from the sync position that was established by the main counting section 130. At this time, an enable signal EN is sent from the sub-counting section 140 to the out-of-sync detection section 160, which starts detecting the out-of-sync state.

If the out-of-sync state is detected by the out-of-sync detection section 160, an out-of-sync detection signal SOUT is output from the out-of-sync detection section 160 to the sub-counting section 140. Upon reception of the signal, the sub-counting section 140 stops the counting operation that was started in response to the FPS detection notification signal that was output from the sync pattern detection section 110 and makes a transition from the sub-synchronized state to an out-of-sync state.

As described above, if the consecutive CRC errors judgment section 180 detects consecutive CRC errors for 32 multi-frames that correspond to a sync position that has been set by the main counting section 130, a sync position of the sub-counting section 140 is captured by the main counting section 130. Also at this time, the sub-counting section 140 makes a transition from the synchronized state to an out-of-sync state. For example, assume a case that in the example of FIG. 5 the main counting section 130 is in a synchronized state receiving FPS detection notification signals a and the sub-counting section 140 is in a synchronized state receiving second-kind FPS detection notification signals b. If consecutive CRC errors are detected by the consecutive CRC errors judgment section 180, the sync position of the sub-counting section 140 is captured by the main counting section 130 and the sub-counting section 140 makes a transition to an out-of-sync state. When receiving a third-kind FPS detection notification signal c, the sub-counting section 140 again makes a transition to a synchronized state at a sync position corresponding to the input time point of the FPS detection notification signal c.

Next, the details of the main-counting section 130 and the sub-counting section 140 will be described.

Figure 9:
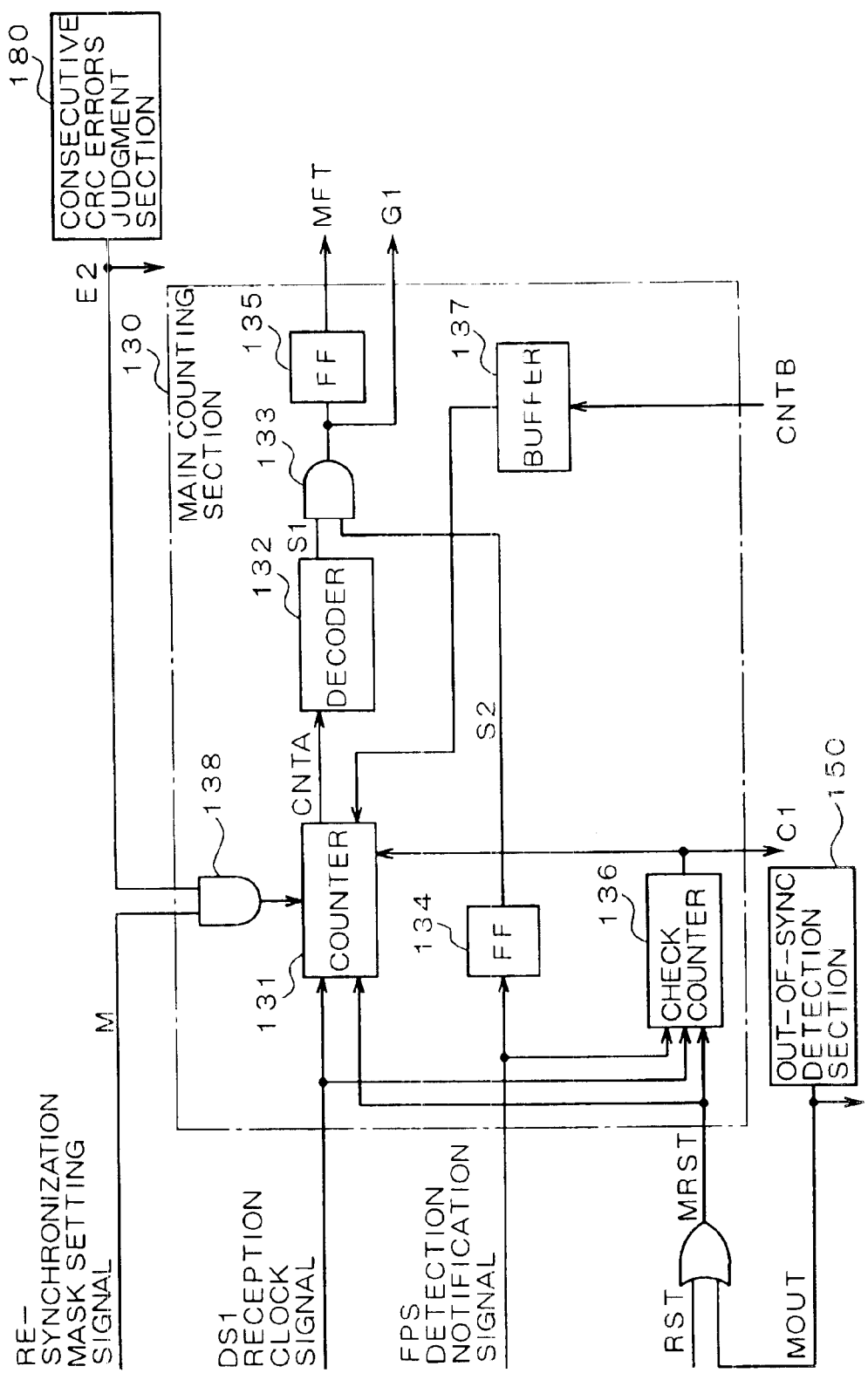
FIG. 9 shows the detailed configuration of the main counting section.

FIG. 9 shows the configuration of the main counting section 130 and the connections thereof to peripheral sections. As shown in FIG. 9, the main counting section 130 includes a counter 131, a decoder 132, two AND gates 133 and 138, two flip-flops (FFs) 134 and 135, a check counter 136, and a buffer 137.

When a main reset signal MRST is input to the main counting section 130, a counting operation of the counter 131 is reset and the counting initial value thereof is set at "0." If the count value of the check counter 136 becomes "1," the counter 131 cyclically performs a counting operation in a count value range of "0" to "4,631" in synchronism with DS1 reception clock signals. The decoder 132 receives an m-bit parallel output (13 bits are needed to express up to "4,631") of the counter 131. The output of the decoder 132 is at a high level if the m bits have predetermined values, respectively, and is at a low level if the m bits do not have the predetermined values, respectively. For example, the decoder 132 is set so that the output of the decoder 132 is at a high level if the count value of the counter 131 is "0," and is at a low level if the count value is a value other than "0."

The AND gate 133 ANDs two signals that are input to its two input terminals. One input terminal receives a signal that is output from the decoder 132, and the other input terminal receives a signal obtained by delaying an FPS detection notification signal that is input to the main counting section 130 via the flip-flop 134 by one period of the reception clock signal. When the FPS detection notification signal is input to the main counting section 130, the counter 131 starts a counting operation in which the initial value is set at "0." (Actually, the counting operation of the counter 131 is started indirectly because the count value of the check counter 136 becomes "1" after the input of the FPS detection notification signal.) If the count value of the counter 131 is "0," a signal that is output from the decoder 132 at the next clock has a logical value "1." Therefore, the time point when the FPS detection notification signal is taken out from the flip-flop 134 after being delayed by one period of the DS1 reception signal coincides with the time point when the output of the decoder 132 becomes "1." Therefore, a signal having a logical value "1" is output from the AND gate 133 at this time point. This signal is taken out as a multi-frame timing signal MFT via the flip-flop 135.

When a main reset signal MRST is input to the main counting section 130, the check counter 136 is reset (e.g., the counting initial value is set at "0") and starts a counting operation. For example, the check counter 136 is a 1-bit counter. When receiving a first FPS detection notification signal, the check counter 136 changes its count value from "0" to "1." The check counter 136 thereafter holds the count value "1" until it is reset again. The count value of the check counter 136 is also used as an enable signal for enabling a counting operation of the counter 131; the counter 131 starts a counting operation on condition that the count value of the check counter has become "1." The buffer 137 serves to cause the counter 131 of the main counting section 130 to capture the count value of the counter 141 of the sub-counting section 140.

When not receiving a re-synchronization mask setting signal M, one input terminal of the AND gate 138 is given a logical value "1" and hence the AND gate 138 sends the counter 131 a re-synchronization instruction signal E2 that is input from the consecutive CRC errors judgment section 180 to the other input terminal. On the other hand, when receiving a re-synchronization mask setting signal M, the one input terminal of the AND gate 138 is given a logical value "0" and hence the AND gate 138 does not send the counter 131 a re-synchronization instruction signal E2 that is input from the consecutive CRC errors judgment section 180 to the other input terminal, that is, makes the signal E2.

Figure 10:
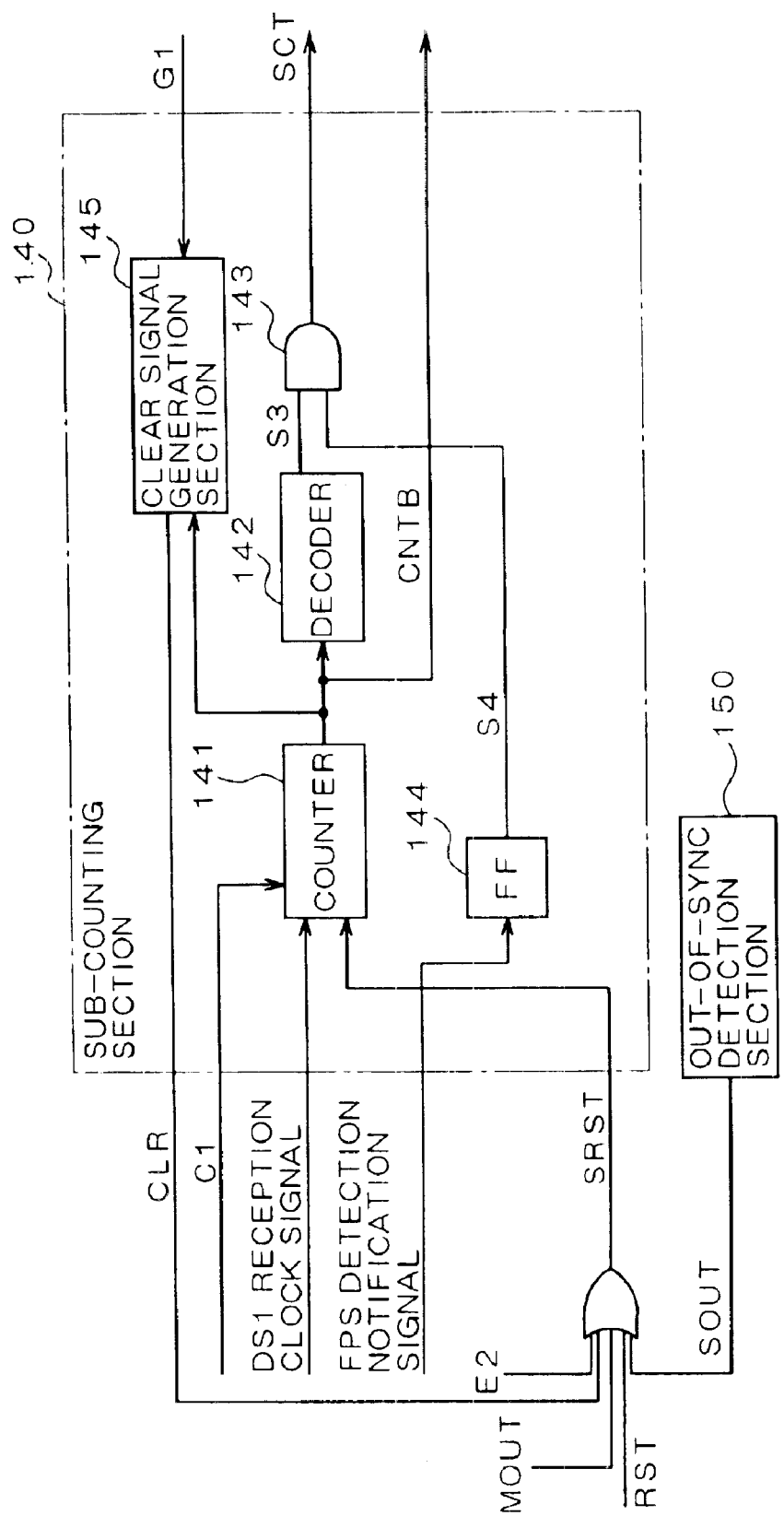
FIG. 10 shows the detailed configuration of the sub-counting section.

FIG. 10 shows the configuration of the sub-counting section 140 and the connections thereof to peripheral sections. As shown in FIG. 10, the sub-counting section 140 includes a counter 141, a decoder 142, an AND gate 143, a flip-flop (FF) 144, and a clear signal generation section 145.

When a sub-reset signal SRST is input to the sub-counting section 140, a counting operation of the counter 141 is reset and the counting initial value thereof is set at "1." If the count value of the check counter 136 of the main counting section 130 becomes "1," the counter 141 cyclically performs a counting operation in a count value range of "1" to "4,632" in synchronism with DS1 reception clock signals. The decoder 142 receives an m-bit parallel output of the counter 141. The output of the decoder 142 is at a high level if the m bits have predetermined values, respectively, and is at a low level if the m bits do not have the predetermined values, respectively. For example, the decoder 142 is set so that the output of the decoder 142 is at a high level if the count value of the counter 141 is "1," and is at a low level if the count value is a value other than "1."

The AND gate 143 ANDs two signals that are input to its two input terminals. One input terminal receives a signal that is output from the decoder 142, and the other input terminal receives a signal obtained by delaying an FPS detection notification signal that is input to the sub-counting section 140 via the flip-flop 144 by one period of the reception clock signal. When the FPS detection notification signal is input to the sub-scanning section 140, the counter 141 starts a counting operation in which the initial value is set at "1." (Actually, the counting operation of the counter 141 is started indirectly because the count value of the check counter 136 becomes "1" after the input of the FPS detection notification signal.) If the count value of the counter 141 is "1," a signal that is output from the decoder 142 at the next clock has a logical value "1." Accordingly, the time point when the FPS detection notification signal is taken out from the flip-flop 144 after being delayed by one period of the DS1 reception clock signal coincides with the time point when the output of the decoder 142 becomes "1." Accordingly, a signal having a logical value "1" is output from the AND gate 143 at this time point. This signal is output from the sub-counting section 140 as a sub-counting timing signal SCT. The sub-counting timing signal SCT can be used as a monitoring output in monitoring whether the sub-counting section 140 is in a synchronized state.

Receiving the count value of the counter 141 and the output value G1 of the AND gate 133 of the main counting section 130, the clear signal generation section 145 outputs a signal for resetting the counter 141 when the two input values have a predetermined relationship. Specifically, the clear signal generation section 145 resets the counter 141 if the count value of the counter 141 is "2" when the AND gate 133 of the main counting section 130 outputs a signal having a logical value "1" in response to a first-input FPS detection notification signal a. The counter 131 of the main counting section 130 performs a counting operation in which the initial value is set at "0," and the AND gate 133 outputs a signal having a logical value "1" when the count value becomes "1." In contrast, the counter 141 of the sub-counting section 140 performs a counting operation in which the initial value is set at "1." Therefore, the fact that the AND gate 133 of the main counting section 130 outputs a signal having a logical value "1" when the count value of the counter 141 is "2" means that the main counting section 130 and the sub-counting section 140 establish the sync position corresponding to the same FPS detection notification signal a. The counter 141 of the sub-counting section 140 is reset at this time point and the sync position in response to a FPS detection notification signal b that will be input next is established.

Next, the operations of the main counting section 130 and the sub-counting section 140 will be described in detail.

Figure 11:
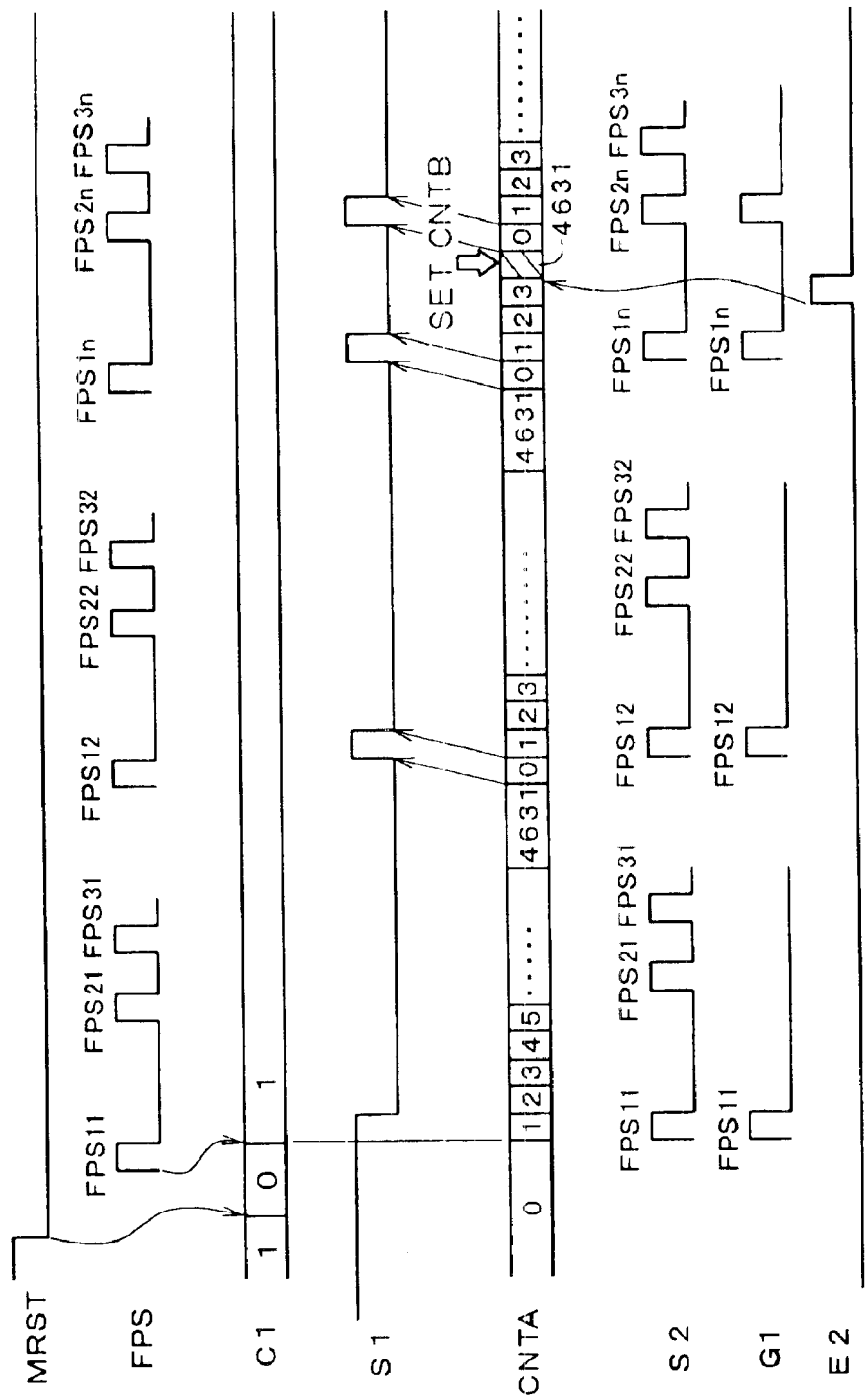
FIG. 11 is an operation timing chart of the main counting section.
Figure 12:
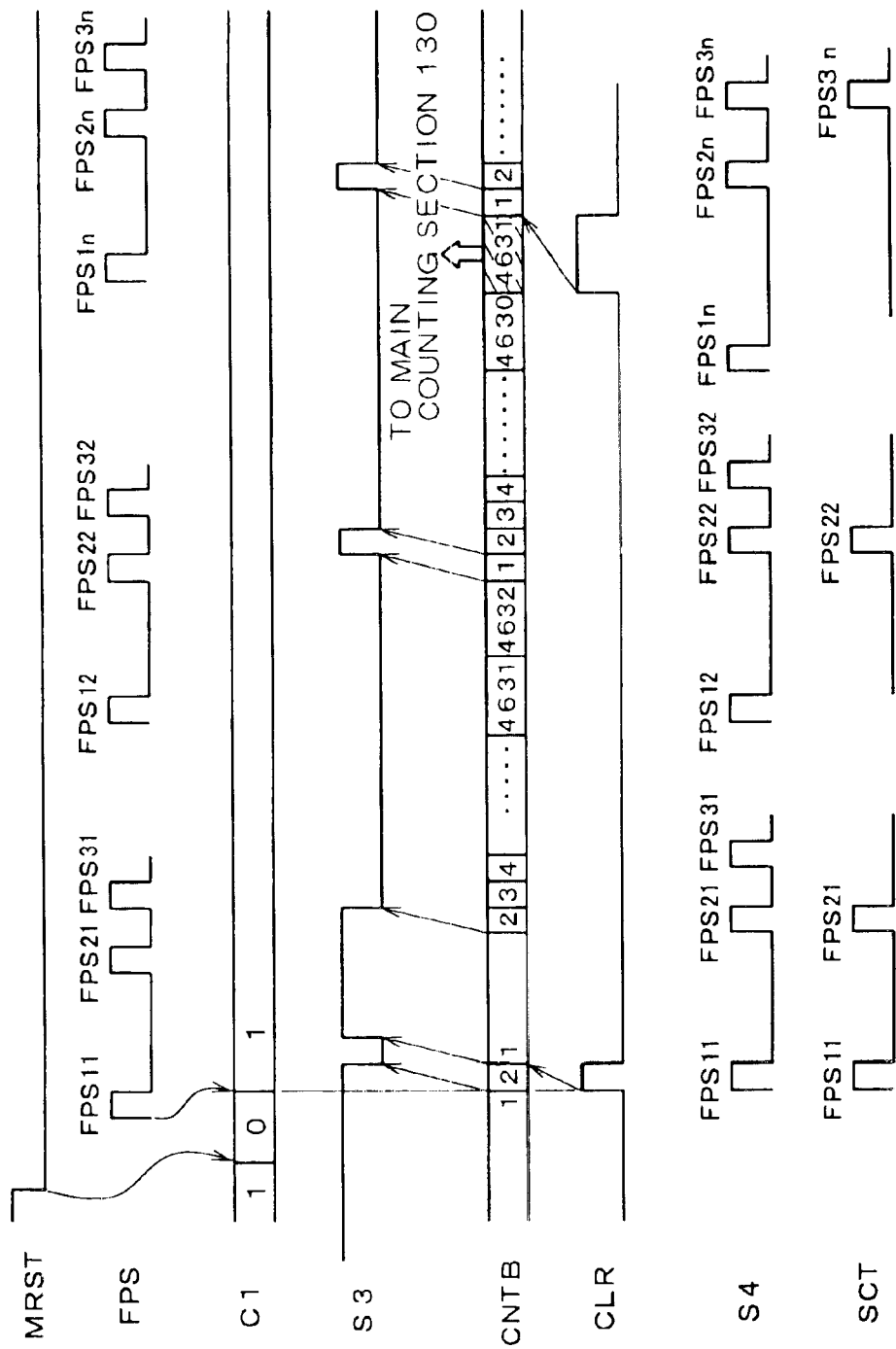
FIG. 12 is an operation timing chart of the sub-counting section.

FIG. 11 is an operation timing chart of the main counting section 130. FIG. 12 is an operation timing chart of the sub-counting section 140. The signal names such as "MRST" shown in FIGS. 11 and 12 correspond to the names of the respective input/output signals of the constituent sections shown in FIGS. 9 and 10.

If a main reset signal MRST that is input to the main counting section 130 is canceled, the count value of the check counter 136 is initially set at "0", thus being updated to "1" in synchronism with the input of the next FPS detection notification signal. After the count value has become "1," a counting operation of the counter 131 is started. The logical value of an output signal S1 of the decoder 132 is made "1" when the count value of the counter 131 becomes "1." On the other hand, a signal S2 produced by delaying an input FPS detection notification signal ("FPS" shown in FIGS. 11 and 12) by one period of the DS1 reception clock signal is output from the flip-flop 134. A signal G1 corresponding to the AND of the two signals S1 and S2 is output from the AND gate 133. Therefore, signals G1 are periodically output from the AND gate 133 in response to only first-input FPS detection notification signals. A multi-frame timing signal MFT produced by delaying the signal G1 via the flip-flop 135 by one period of the DS1 reception clock signal is output from the main counting section 130.

If the out-of-sync state is detected by the out-of-sync detection section 150 and an out-of-sync detection signal MOUT is output therefrom, a main reset signal MRST is input to the main counting section 130. Therefore, the counting operation of the counter 131 is returned to the initial state and the above-described series of synchronization operations is repeated from the start in response to the next, first-input FPS detection notification signal.

If a re-synchronization instruction signal E2 is input from the consecutive CRC errors judgment section 180 to the main counting section 130, a preset operation of the counter 131 is enabled and a count value of the counter 141 of the sub-counting section 140 that is input to the buffer 137 at this time point is captured by the counter 131. Since the counter 141 of the sub-counting section 140 performs a counting operation that is synchronized with second-input FPS detection notification signals, the main counting section 130 thereafter captures the sync position of the sub-counting section 140 and outputs a new multi-frame timing signal MFT corresponding to this sync position.

Although the main counting section 130 and the sub-counting section 140 thereafter operate with the same sync position, the counter 141 of the sub-counting section 140 is reset by the clear signal generation section 145 of the sub-counting section 140. Alternatively, if the out-of-sync state is detected by the out-of-sync detection section 160 corresponding to the sub-counting section 140, a sub-reset signal SRST is input to the sub-counting section 140 and the counter 141 is thereby reset. When reset in such a manner, the counter 141 starts a new counting operation. Further, the sync position corresponding to the next FPS detection notification signal is established.

As described above, in the frame synchronizing circuit 100 according to the embodiment, in a case where sync patterns are detected at a plurality of locations of each multi-frame, an operation that the main counting section 130 performs synchronization based on a position where a sync pattern is detected first and an operation that the sub-counting section 140 performs synchronization based on a position where a sync pattern is detected next are performed in parallel. If a sync position which has been established by the main counting section 130 is in error, the sync position itself which has been established by the sub-counting section 140 is captured by the main counting section 130 and used therein as a new sync position. Therefore, the time that is taken from detection of a sync position error to setting of a new sync position can be shortened.

If the sync positions of the main counting section 130 and the sub-counting section 140 coincide with each other, the sync position of the sub-counting section 140 is shifted. Therefore, synchronization can reliably be performed at different time points in the main counting section 130 and the sub-counting section 140 without the need for performing a complex control.

If a sync position of the sub-counting section 140 is found to be in error, the next candidate for a sync position is searched for. This reduces the possibility that a sync position that is captured when a sync position of the main counting section 130 is in error is also in error. Therefore, the time that is taken until synchronization is established finally can be shortened.

By detecting that a sync position of the main counting section 130 is in error in the form of presence/absence of consecutive CRC errors, a sync position error that occurs in a case where the same pattern as the sync pattern appears in each multi-frame can be detected correctly.

By inputting a re-synchronization mask setting signal to the main counting section 130, sync position error detection based on presence/absence of consecutive CRC errors can be disabled. This prevents erroneous detection in a case where setting is so made that data similar to the sync pattern does not exist in each multi-frame.

By detecting, by a simple method of monitoring bit errors in a sync pattern with the out-of-sync detection section 150, that a sync position which has been established by the main counting section 130 is clearly in error, a transition to search for the next candidate for a sync position can be made quickly. Therefore, the time that is taken until setting of a correct sync position can be shortened.

The invention is not limited to the above embodiment, and various modifications are possible without departing from the spirit and scope of the invention. For example, although in the above embodiment two sync positions are detected by using two frame synchronizing units, that is, the main counting section 130 and the sub-counting section 140, 3rd, 4th, . . . sync positions may also be detected in parallel by increasing the number of sub-counting sections 140. This may be done in such a manner that a plurality of sub-counting sections are layered and the relationship between two adjacent sub-counting sections is made the same as the above-described relationship between the main counting section 130 and the sub-counting section 140. That is, a sync position of a higher-rank sub-counting section is so set as not to coincide with that of a lower-rank sub-counting section. If a sync position of the highest-rank sub-counting section is captured by the main counting section 130, sync positions of the second and following sub-counting sections may be moved up in order.

Although in the above embodiment the out-of-sync detection section 160 is provided that corresponds to the sub-counting section 140, it may be omitted. In this case, there may occur an event that a sync position which has been established by the sub-counting section 140 is clearly in error. However, since this error is detected by the out-of-sync detection section 150 when this sync position is captured by the main counting section 130, correction to another sync position is made quickly. Sections similar to the CRC error detection section 170 and the consecutive CRC errors judgment section 180 may additionally be connected to the sub-counting section 140.

As described above, according to the invention, in a case where sync patterns are detected at a plurality of locations of a frame, an operation that synchronization is performed based on a position where a sync pattern is detected and an operation that synchronization is performed based on a different position from the above position are performed in parallel. If a sync position which has been established is in error, another parallel-detected sync position itself that is different from the initial or original sync position is captured and used as a new sync position. Therefore, the time that is taken until establishment of a new sync position can be shortened.

Further, according to the invention, by detecting a sync position error based on information other than a sync pattern in each frame, a sync position error can correctly be detected in a case where the same pattern as the sync pattern appears in the frame.

What is claimed is:

1. A frame synchronizing circuit comprising:
    a synchronization pattern detecting unit that detects a first pattern and a second pattern each similar to a predetermined synchronization pattern in input data within a predetermined period of time;
    a first frame synchronizing unit synchronizing with the first pattern at a first position of the input data;
    a second frame synchronizing unit synchronizing with the second pattern at a second position of the input data;
    a first error detecting unit that detects that the first position is different from a position of the predetermined synchronization pattern, and controls the first frame synchronizing unit to operate in accordance with the second position; and
    a second error detecting unit that detects that the second position is different from a position of the predetermined synchronization pattern,
    wherein the synchronization pattern detecting unit detects a third pattern similar to the predetermined synchronization pattern in the input frame, and controls the second frame synchronizing unit to operate in accordance with a third position.

2. A frame synchronizing circuit comprising:
a synchronization pattern detecting unit that detects a first pattern and a second pattern each similar to a predetermined synchronization pattern in input data within a predetermined period of time;
a first frame synchronizing unit synchronizing with the first pattern at a first position of the input data;
a second frame synchronizing unit synchronizing with the second pattern at a second position of the input data; and
a first error detecting unit that detects the first position is different from a position of the predetermined synchronization pattern, and controls the first frame synchronizing unit to operate in accordance with the second position,
wherein the first error detecting unit detects that the first position is different from the position of the predetermined synchronization pattern based on information other than the synchronization pattern in the frame.

3. A frame synchronizing circuit according to claim 2, wherein
the information includes a CRC code (cyclic redundancy check), and
when detecting by using the CRC code that an out-of-synchronization state of the frame continues for a predetermined period of time, the first error detecting unit detects that the first position is not the position of the predetermined synchronization pattern.

4. A frame synchronization circuit comprising:
a synchronization pattern detecting unit that detects a first pattern and a second pattern each similar to a predetermined synchronization pattern in input data within a predetermined period of time;
a first frame synchronizing unit synchronizing with the first pattern at a first position of the input data;
a second frame synchronizing unit synchronizing with the second pattern at a second position of the input data; and
a first error detecting unit that detects that the first position is different from a position of the predetermined synchronization pattern, and controls the first frame synchronizing unit to operate in accordance with the second position,
wherein the synchronization by the second frame synchronizing unit is selectively disabled by setting a predetermined mask.

5. A frame synchronizing circuit comprising:
a synchronization pattern detecting unit that detects a first pattern and a second pattern each similar to a predetermined synchronization pattern in input data within a predetermined period of time;
a first frame synchronizing unit synchronizing with the first pattern at a first position of the input data;
a second frame synchronizing unit synchronizing with the second pattern at a second position of the input data;
a first error detecting unit that detects that the first position is different from a position of the predetermined synchronization pattern, and controls the first frame synchronizing unit to operate in accordance with the second position; and
an out of sync error detecting unit that detects that the first position is different from the position of the predetermined synchronization pattern, based on a bit error with respect to the first pattern, thereby indicating an out of sync state.

6. A frame synchronizing circuit comprising:
a synchronization pattern detecting unit that detects a plurality of patterns similar to a predetermined synchronization pattern in input data within a predetermined period of time;
a plurality of frame synchronizing units each synchronizing with one of the plurality of patterns specified by the order in which patterns are detected at a position of the input data;
a first error detecting unit that detects that a first position of the plurality of positions is different from a position of the predetermined synchronization pattern, and controls the frame synchronizing unit corresponding to the first position to operate in accordance with a second position of the plurality of positions other than the first position; and
a second error detecting unit that detects that the second position is different from the position of the predetermined synchronization pattern, and controls the frame synchronizing unit corresponding to the first position to operate in accordance with a third position of the plurality of positions other than the first position and the second position.

7. A frame synchronizing circuit comprising:
a synchronization pattern detecting unit that detects a plurality of patterns similar to a predetermined synchronization pattern in input data within a predetermined period of time;
a plurality of frame synchronizing units each synchronizing with one of the plurality of patterns specified by the order in which patterns are detected at a position of the input data; and
a first error detecting unit that detects that a first position of the plurality of positions is different from a position of the predetermined synchronization pattern, and controls the frame synchronizing unit corresponding to the first position to operate in accordance with a second position of the plurality of positions other than the first position,
wherein the first error detecting unit detects that the first position is different from the position of the predetermined synchronization pattern based on information other than the synchronization pattern in the frame.

8. A frame synchronizing circuit according to claim 7, wherein
the information includes a CRC code (cyclic redundancy check), and
when detecting by using the CRC code that an out-of-synchronization of the frame continues for a predetermined period of time, the first error detecting unit detects that the first position is not the position of the predetermined synchronization pattern.

9. A frame synchronizing circuit comprising:
a synchronization pattern detecting unit that detects a plurality of patterns similar to a predetermined synchronization pattern in input data within a predetermined period of time;
a plurality of frame synchronizing units each synchronizing with one of the plurality of patterns specified by the order in which patterns are detected at a position of the input data; and
a first error detecting unit that detects that a first position of the plurality of positions is different from a position of the predetermined synchronization pattern, and controls the frame synchronizing unit corresponding to the first position to operate in accordance with a second position of the plurality of positions other than the first position, wherein the synchronization by the plurality of frame synchronizing units are selectively disabled by setting a predetermined mask.

* * * * *